United States Patent [19]

Papetti

[11] Patent Number: 4,726,708
[45] Date of Patent: Feb. 23, 1988

[54] MATTRESS-TYPE GABION FOR PRODUCING PROTECTIVE COVERING STRUCTURES TO BE USED ON SOIL SURFACES SUBJECT TO EROSION

[75] Inventor: Andrea Papetti, Casalecchio di Reno, Italy

[73] Assignee: Officine Maccaferri S.P.A., Bologna, Italy

[21] Appl. No.: 942,872

[22] Filed: Dec. 17, 1986

[30] Foreign Application Priority Data

Dec. 17, 1985 [IT] Italy .................. 5136/85[U]

[51] Int. Cl.⁴ .................. E02B 3/12; B65D 6/08; B65D 25/04
[52] U.S. Cl. .................. 405/19; 405/16; 405/32; 220/19; 220/22
[58] Field of Search .................. 405/15–20, 405/32; 139/425 R; 140/24; 220/19, 22; 428/247, 255, 256

[56] References Cited

U.S. PATENT DOCUMENTS

| | | | |
|---|---|---|---|
| 1,165,194 | 12/1915 | Maccaferri | 405/16 |
| 4,394,924 | 7/1983 | Zaccheroni | 405/16 X |
| 4,483,640 | 11/1984 | Berger et al. | 405/15 |

FOREIGN PATENT DOCUMENTS

| | | | |
|---|---|---|---|
| 968726 | 6/1975 | Canada | 405/32 |
| 94893 | 7/1960 | Netherlands | 405/19 |
| 845863 | 8/1960 | United Kingdom | 405/32 |

OTHER PUBLICATIONS

"Gabions: Economical Environmentally Compatible Bank Control", Burroughs Civil Engineering-ASCE, Jan. 1979.

*Primary Examiner*—Nancy J. Stodola
*Attorney, Agent, or Firm*—Karl F. Ross; Herbert Dubno

[57] ABSTRACT

A mattress-type gabion for ground stabilization is formed from a base sheet of wire mesh by providing the sheet with folds from spaced apart transverse ribs and having the panels of the folds tied together at transversely spaced locations along each rib. Cuts in the base sheet flanking each rib zone can define other folds which can be tied to the ribs when edge strips of the sheet are folded up, thereby forming stably upwardly open compartments which can be filled with ballast and then closed by a mesh cover.

5 Claims, 6 Drawing Figures

MATTRESS-TYPE GABION FOR PRODUCING PROTECTIVE COVERING STRUCTURES TO BE USED ON SOIL SURFACES SUBJECT TO EROSION

FIELD OF THE INVENTION

The invention relates to mattress-type gabion for use as a covering or other protective structures for preventing soil erosion caused by surface water and infiltration, and for consolidating soil against landslides in the building of river embankments, lakeside, coastal and mountain side earthworks, road construction and similar works.

BACKGROUND OF THE INVENTION

It has been proposed to use so called "gabions," that is to say parallelepipedal containers equipped with covers, formed from panels of metal netting and ties that are resistant to corrosion and mechanical stress for earth stabilization.

Another known approach to such protective systems makes use of special "mattress gabions", that is to say multiple-compartment containers able to cover, without any special continuity problems, very large expanses of ground, protecting them from erosion and consolidating them against landslides as indicated above. The dimensions of such containers are chosen such that are of notably greater length than width, and of a height notably less than their length and width. These boxes or containers, can be composed of a panel or "base sheet" destined to form the bottom, longitudinal and transverse walls of the boxes and of a plurality of secondary sheets shaped and set out to form the transverse partitions dividing the inside of the box into a plurality of compartments, which are in turn upwardly closed by a "cover sheet".

Transverse partitions of these units tend to open out in the center portion. This disadvantage can, to varying degrees, compromise the correct weight distribution of ballast in the compartments, and consequently the consistency with which the "mattress" adheres to the surface of the soil to be protected, as well as the very soundness and structural continuity of the "mattress gabion" itself. This drawback can also compromise or even prevent the unloading and laying of already ballasted "mattresses", to be undertaken by means of chutes from boats or motor vehicles.

OBJECT OF THE INVENTION

The object of the present invention is to provide "mattress gabion" that, under all laying conditions, avoids deformation of the bottom wall of the "mattress" and the "ribbing" elements constituting the compartments' transverse partitions, as an effect of the contiguous upraised sections of each individual "ribbing" element opening out in the area contiguous to the intersection of the plane of the upraised section and the plane of the bottom wall, due to the action of the ballast during filling of the "mattress".

SUMMARY OF THE INVENTION

In the present invention, during factory production of the basic product, using a metal netting "sheet", with a flat polygonal, preferably hexagonal, warp, and using, preferably automatic, mechanical means, suitable criteria for determining the size of the panels or "sheets" for forming the "ribbing" and the border strips of the suitable cuts are formed perpendicular to the edges adjacent to the superimposed upraised sections of each element in the "ribbing", and running along the same line as the latter. The border strips of the "base sheet" and of the upraised parts of the "ribbing" are folded, and the side walls of the "mattress" are connected to the elements in the "ribbing" and to each other using stapled "stitches". The shaping of the compartments destined to be filled with ballast is thus effected, before the box-like structure is closed with the cover "sheet". In the said system, the two upraised sections of the ribbing obtained by the first folding operation of the base "sheet" or panel, are joined together using staple ties positioned at the opposite ends of the said "ribbing" elements, corresponding to the points where the side edges of the upraised sections, forming the "ribbing" elements, intersect the two longitudinal borders of the "base sheet". The ribs are thus joined and held stable at the ends only, and are free to move apart, opening out the "ribbing" itself, in the center zone of each compartment's transverse partition. The deformation of the upraised sections, which, originally was formed by two upraised sections of each individual "ribbing" element, previously obtained by "folding" the "base sheet", can be limited at several points, preferably four, close to the fold in which upraised section of the "ribbing" elements, where they intersect the bottom wall or "base sheet". The stable connection is obtained by means of a second twisting operation on the wire of the corresponding sides of the flat geometric figures constituting the warp of the two upraised sections of the metal netting. This second twisting operation should preferably be carried out on the corresponding sides of the weft of the warp of metal netting, where the metal netting of both sides of the upraised sections constituting a "ribbing" element has itself already been twisted as part of its original warp. The second twisting operation is effected using mechanical means, preferably automatic, for handling the warp. The second twisting operation should preferably, although not exclusively, be carried out on the sides of the warp links that are situated perpendicularly to the bottom plane of the "base sheet", from between the minimum distance possible, preferably up to no more than 3 centimeters from the bottom plane.

SPECIFIC DESCRIPTION

The base sheet 1 features folds suitable for the forming of the "ribbing" 2 and longitudinal edges 5. The sheet constituting the cover is shown at 3.

The stable connection is effected, producing a monobloc body, the "ribbing", between the two upraised sections of metal netting, by means of second twisting operations carried out on the metal netting at points 4 of the warp, and at the minimum possible distance from the base sheet 1.

Figure 1:
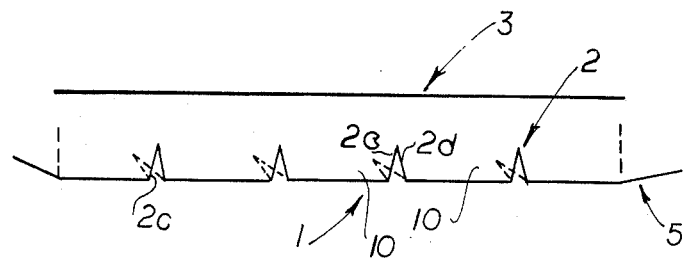
FIG. 1 illustrates the base sheet and cover sheet in longitudinal cross section.
Figure 2:
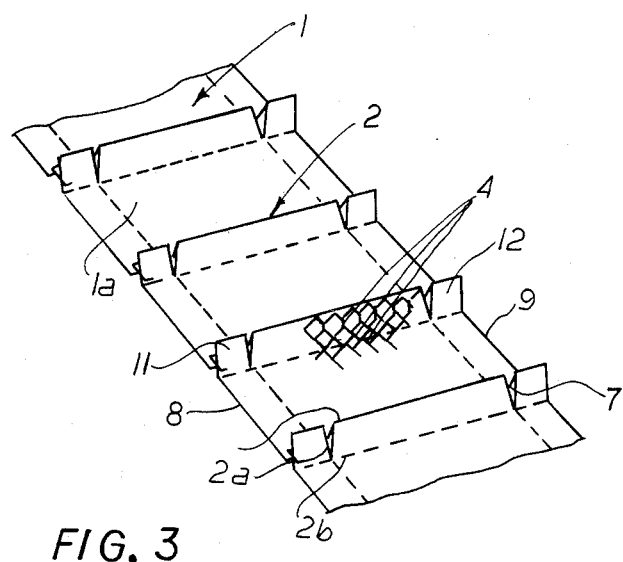
FIG. 2 is an illustration in perspective of the base sheet during the first stage in the production of the same, showing the points where the second warp twisting operation is carried out.
Figure 3:
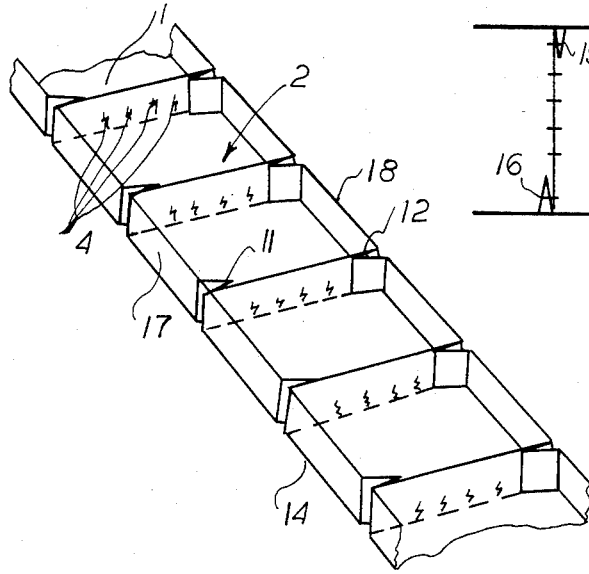
FIGS. 3 and 4 illustrate the same base sheet at a later stage, during the setting up of the same on site.
Figure 4:
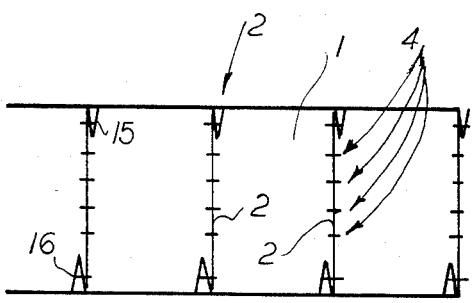

More particularly the base sheet 1 is composed of a wire mesh (See FIG. 4) and is provided with a pair of cuts 6, 7 (FIG. 2) parallel to the longitudinal edges 8 and 9 of the sheet which is far longer than it is wide. The cuts 6 and 7 are spaced apart by the creased or folded regions 2. Each fold 2 is formed by a crease 2a at the peak or crest of the fold and a pair of creases 2b at the junction of the folds with the freight base 1a defined between the folds. Each fold, therefore, forms panels 2d and 2e turned toward a respective compartment 10 generated when the folds are produced.

Figure 6:
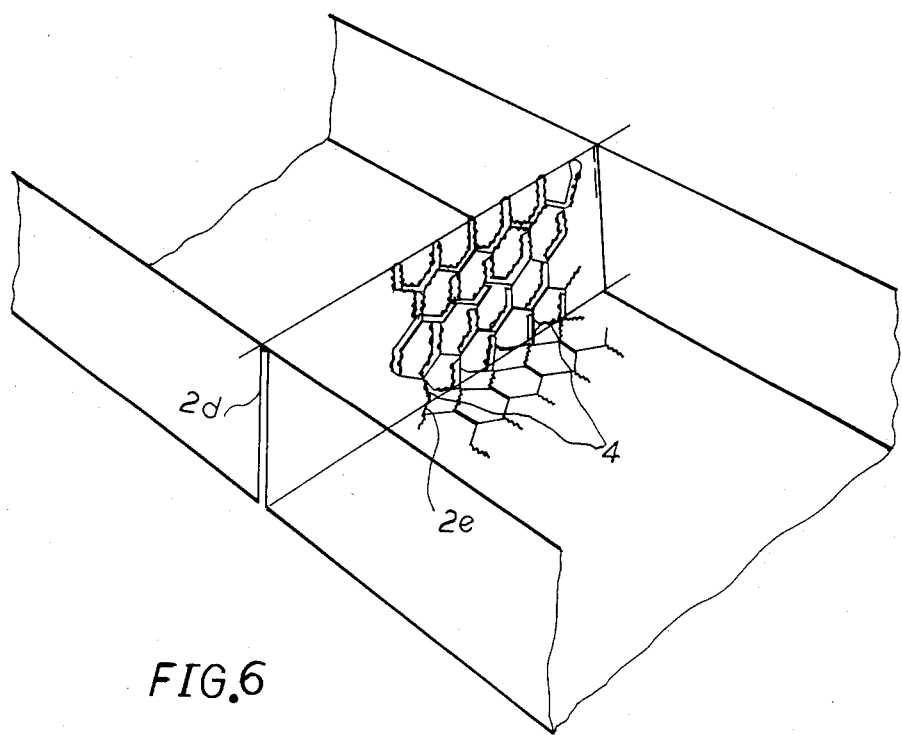
FIG. 6 is a detail illustration of the stable connection and twisting points.

When each fold is produced, it is tied at points 4 by twisting the wire around the vertical portions of the hexagonal mesh of the two panels 2e and 2d which are formed as can be seen from FIG. 6.

In addition, folds 11 and 12 are formed in edge strips defined between each cut 6, 7 and the associated edge 8, 9.

The edge strips are then folded upwardly at creases 14, for example, so that each fold 11 or 12 comes to lie along the tied fold 2 previously formed. Additional ties 15 and 16 hold these folds in place (FIG. 4), thereby defining the sides of the compartments 10.

Figure 5:
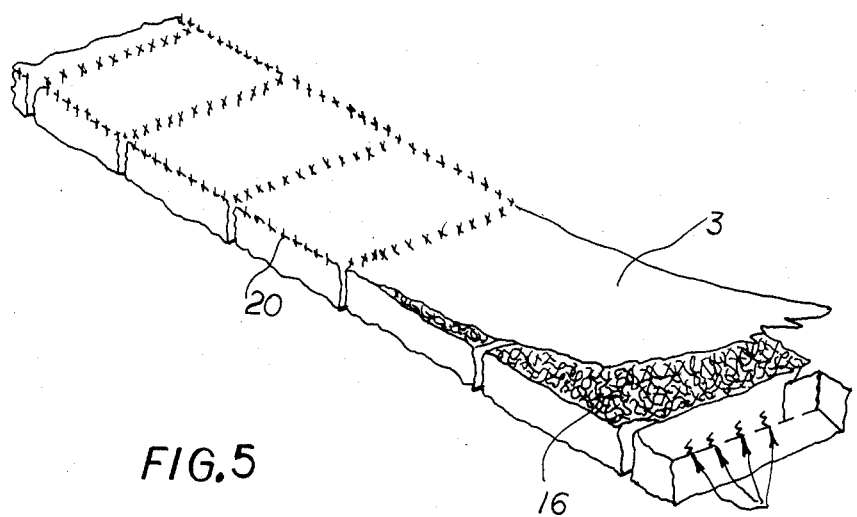
FIG. 5 illustrates the mattress gabion when set up and filled with ballast.

The upwardly open compartments 10 can be filled with ballast 16 (FIG. 5) and the cover sheet 3 can be applied. This cover sheet can also be composed of hexagonal wire mesh. The cover sheet can be tied in place to the ribs 2 and the lateral wires 17 and 18 defining the compartments as represented at 20.

It is understood that the protective framework afforded to the present invention, which has here been illustrated in outline and by way of example, extend to alternative embodiments with the same essential characteristics.

I claim:

1. A mattress-type gabion for ground stabilization, comprising an elongated upwardly open compartmented base formed with a multiplicity of longitudinally separated base panels joined together by transversely extending ribs formed unitarily with said base panels from a single mesh sheet, each of said ribs being constituted as a fold having a pair of folded rib panels tied together at a plurality of locations separated along the respective fold and located close to the base panels connected by the respective rib, and side walls secured to said ribs by side wall strips separated from the respective rib by respective cuts parallel to a respective longitudinal edges of the sheet whereby edge folds are formed between each cut and the respective longitudinal edge, are turned inwardly and are tied to the respective rib.

2. The mattress-type gabion defined in claim 1 wherein the rib panels of each rib are tied together by four spaced apart ties at said locations.

3. The mattress-type gabion defined in claim 1 further comprising;
    ballast forming compartments bounded by ribs, side walls and respective base panels;
    a mesh cover overlying said base; and
    means for securing said cover to said ribs and said side walls to close said compartments.

4. A method of making a mattress-tupe gabion which comprises the steps of:
    forming an elongated mesh sheet having a pair of longitudinal edges and spaced apart rib zones defined between a pair of cuts parallel to said longitudinal edges and between each rib zone and a respective longitudinal edge;
    folding each rib zone to form a crease rising from a base panel whereby rib panels are formed below each crest for a multiplicity of ribs along said sheet;
    tying the rib panels of each rib together close to the respective base panels to limit spreading of said ribs;
    forming a side wall fold at each cut in said edge strip and folding said edge strips upwardly to define said walls and turning said side wall folds inwardly to flank the respective ribs; and
    tying the respective side wall folds to said ribs, thereby defining upwardly open compartments between opposing ribs, opposing side walls and a respective base panel.

5. The method defined in claim 4, further comprises the steps of:
    filling said compartments with ballast; and
    closing said compartments with a mesh cover sheet and tying said cover sheet to said ribs and said side walls.

* * * * *